Sept. 16, 1952  F. G. BACK  2,610,547
CATADIOPTRIC TELEPHOTO SYSTEM
Filed Aug. 3, 1951  3 Sheets-Sheet 1

INVENTOR.
Frank G. Back

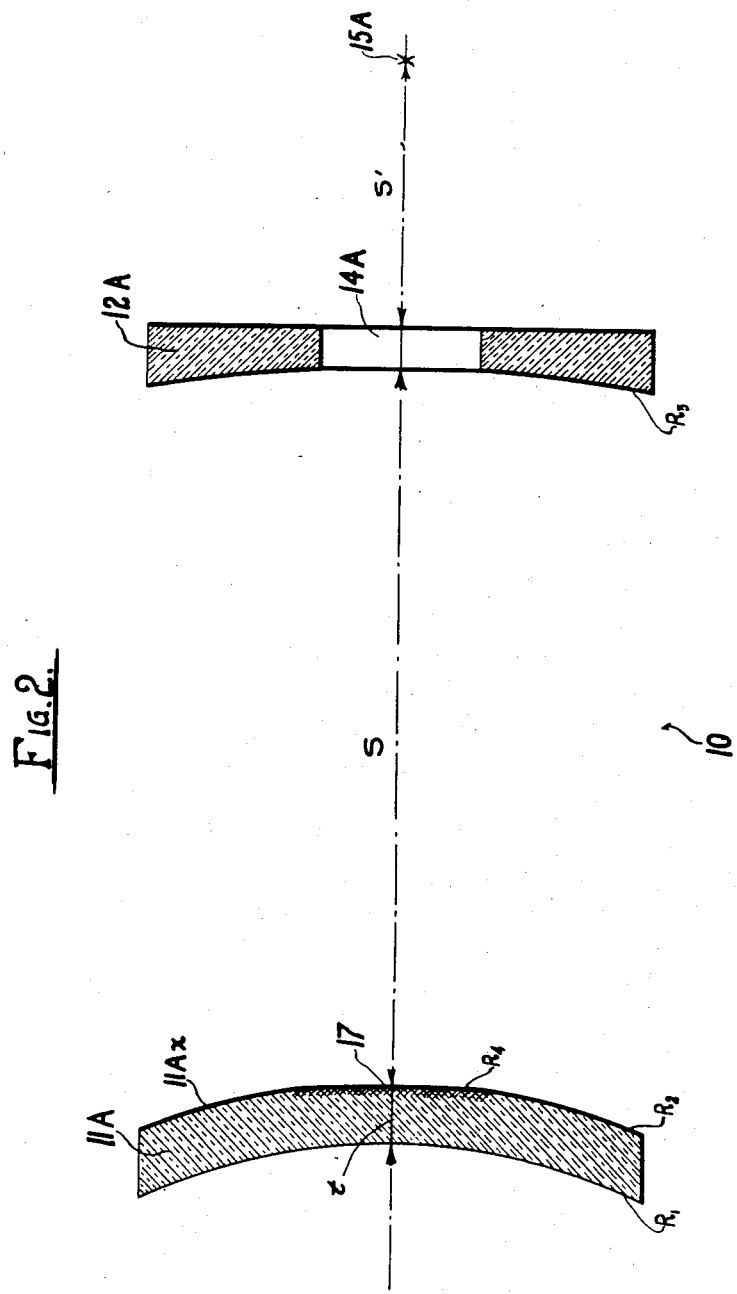

Sept. 16, 1952      F. G. BACK      2,610,547
CATADIOPTRIC TELEPHOTO SYSTEM
Filed Aug. 3, 1951      3 Sheets—Sheet 3

Fig. 3

| Element | $N_D$ | Radii | Thickness: $t$ / Separation: $s$ |
|---|---|---|---|
| 11 | 1.533 | $R_1 = -18.283"$ | $t = .375"$ |
|  |  | $R_2 = -18.750"$ |  |
|  |  |  | $s = 15.000"$ |
| 12 | — | $R_3 = -80.000"$ |  |
|  |  |  | $s = 15.000"$ |
| 13 | — | $\infty$ |  |

Equivalent Focal Length: $+40.000"$, Rel. Aperture: F/8

Fig. 4

| Element | $N_D$ | Radii | Thickness: $t$ / Separation: $s$ |
|---|---|---|---|
| 11A | 1.533 | $R_1 = -26.544"$ | $t = .544"$ |
|  |  | $R_2 = -27.222"$ |  |
|  |  |  | $s = 27.487"$ |
| 12A | — | $R_3 = -97.000"$ |  |
|  |  |  | $s = 27.487"$ |
| 17 | — | $R_4 = -110.429"$ |  |

Equivalent Focal Length: $+80.000"$, Rel. Aperture: F/15

INVENTOR.
Frank G. Back

Patented Sept. 16, 1952

2,610,547

UNITED STATES PATENT OFFICE 2,610,547

CATADIOPTRIC TELEPHOTO SYSTEM

Frank G. Back, New York, N. Y.

Application August 3, 1951, Serial No. 240,219

2 Claims. (Cl. 88—57)

1

The present invention relates to optical systems and more particularly has reference to catadioptric telephoto systems for still cameras, motion picture cameras, telescopes and similar devices in which objectives with long focal length are employed.

It is an object of the present invention to provide objectives which combine very long focal lengths with relatively short lengths and lightweight construction and which have a high degree of correction for all aberrations over the entire field.

It is a further object of the present invention to provide catadioptric telephoto systems which are adequately corrected for monochromatic aberrations, said corrections encompassing the entire region of the electromagnetic spectrum from medium ultra-violet to infra red, the entire range of the electromagnetic spectrum as used in photography.

A further object of the present invention resides in providing a mirror objective with a flat field.

These and other objects of the present invention will in part be obvious and will in part be set forth and described in detail hereinafter.

The conventional type of telephoto lens consists of a positive front element in combination with a negative rear element. Though these lenses are customarily, relatively short, due to the fact that both principal points lie well in front of the positive front surface, nevertheless these lenses are still quite big and unwieldy when extremely long focal lengths are required.

In the present invention spherical mirrors are employed as image forming elements. These spherical mirrors are used in conjunction with a corrective refracting element of close to zero power.

Certain types of catadioptric systems have been employed in the art heretofore. Schmidt, Bouwers, Matsukov, and others have described such systems. However, all these systems were systems of a speed of F:1 and larger. In order to achieve a usable correction for these extreme apertures, which were used in the conventional systems, it was necessary to either place the correction plate in the center of the curvature of the image forming spherical concave mirror or to place the aperture stop of the system at the center of curvature of the spherical concave, image forming mirror in order to accomplish correction for coma, astigmatism and distortion. In these systems, the surfaces of the mirror, as well as the surface of the correction plate, had to be concentric for the same reason. In order to achieve in these conventional systems, a satisfactory spherical correction the correction plate had to be

2 strongly bent and therefore it had to be close to the center of curvature. As it is well known in the art, the radius of curvature equals twice the focal length of a mirror, and it follows that such a system cannot be used for long focal lengths because its total length would be prohibitive.

In the present invention, systems of relatively low speeds are set forth. The relatively low speed in combination with a small field angle of the lenses allows considerable freedom in the positioning of the correction plate and the aperture of the system. In providing systems of low speeds, combined with lenses having a small field angle as set forth in the present invention it was possible to shorten the entire system considerably in spite of the long focal lengths thereof. It was further possible by means of this arrangement to fully preserve the correction for the entire field.

The invention will now be more fully explained by reference to the accompanying drawing in which:

Fig. 2 is a schematic cross-sectional view of another embodiment of the invention.

Fig. 3 is a table correlating the data as they apply to the telephoto system illustrated in Fig. 1; and Fig. 4 is a table correlating the data as they apply to the telephoto system illustrated in Fig. 2.

Figure 1:
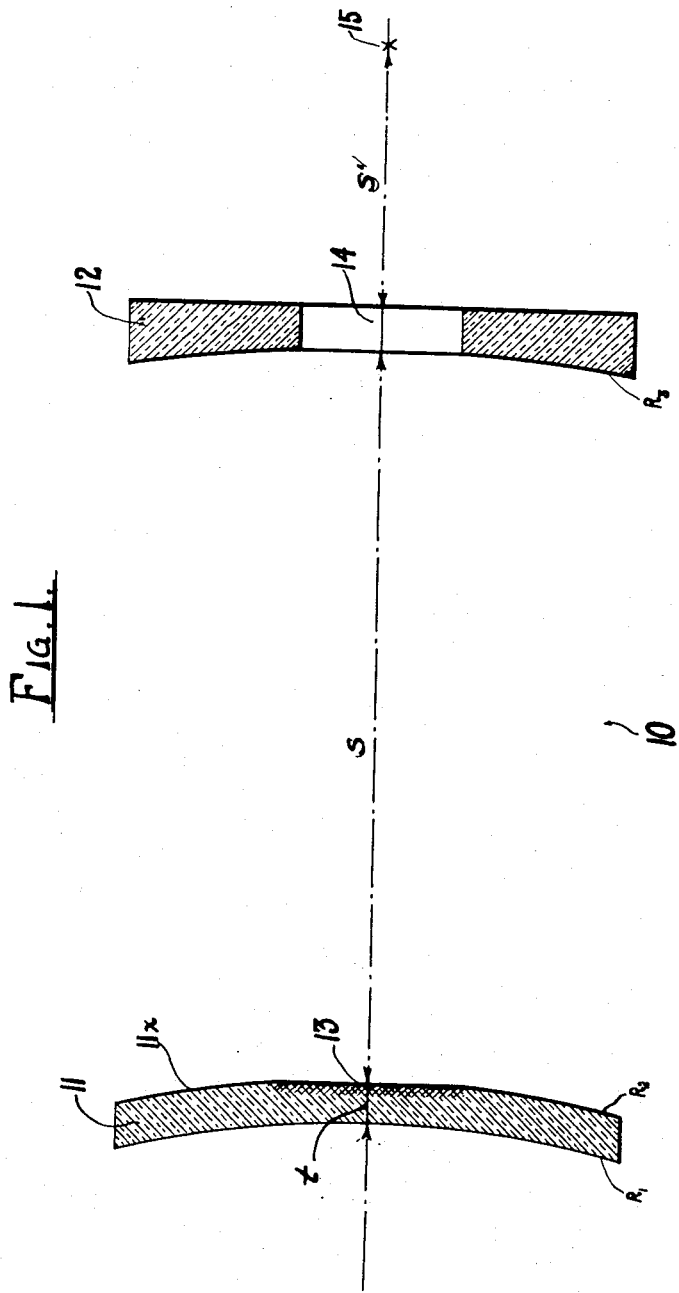
Fig. 1 is a schematic cross-sectional view of one embodiment of the invention.

Having now reference to the drawings, it will be seen that Fig. 1 represents a catadioptric telephoto system which has an equivalent focal length of 40 inches. The annular entrance pupil of the system 10 corresponds to the speed of F:8. The radius of curvature of the correction plate 11 is minus 18.283 and minus 18.750 inches; the clear diameter of the correction plate is six inches and its central thickness is .375 inches. The index of refraction of the index plate=$N_D$ 1.533. The distance between the rear surface of the correction plate 11 and the mirror 12 is 15.500 inches and the spherical mirror 12 has a radius of curvature of 80 inches. The incoming rays from the object pass through the correction plate 11 are reflected by the spherical mirror 12 and are again reflected by the plane mirror 13. The plane mirror 13 is attached to the rear convex surface 11X of the correction plate 11. The spherical mirror 12 is provided with an aperture 14 substantially in the center thereof. The rays reflected by the plane mirror 13 pass through said aperture 14 to form a real image in the focal plane 15 of the system 10 substantially behind said spherical mirror 12.

In Fig. 2 a catadioptric telephoto system is shown which has an equivalent focal length of 80 inches.

In order to achieve satisfactory correction and at the same time keep the over-all length of the system at a satisfactory size, the formation of the image is accomplished by two spherical mirrors. The principal for accomplishing the desired results is the basic principle employed in conventional telephoto systems. The only variation from the conventional arrangement resides in the fact that instead of refracting elements, reflecting elements are employed.

A concave mirror 12A is substituted for the positive front element and a convex mirror 17 is substituted for the negative rear element. These mirrors are preferably chosen in such manner that they substantially balance each other as respects spherical aberration and field curvature so that the negative corrective meniscus serves merely to eliminate residual aberrations.

In this arrangement, therefore, the negative meniscus is again almost powerless and has a front radius of curvature of minus 26.544 and a rear radius of curvature of minus 27.222 inches; the central thickness of said correction plate is .544 inches; and the clear diameter thereof is 6 inches; the index of refraction of the correction plate 11A is $N_D$ 1.533. Rearward of this correction plate at a distance of 27.487 inches concave mirror 12A is located. Concave mirror 12A has a radius of curvature of 97 inches. On the rear surface 11AX of correction plate 11A a convex mirror 17 with a radius of curvataure of 110.429 inches is attached.

The image forming axial parallel rays pass through the correction plate 11A are reflected by concave mirror 12A, then the rays are again reflected by convex mirror 17 and pass through aperture 14A located in the concave mirror 12A to form a real image at a distance of 8.711 inches rearward of said concave mirror 12A.

The data in Figures 3 and 4 for two examples of a telephoto system consisting of three lens elements as follows:

| Element | $N_D$ | Radii | Thickness: $t$ Separation: $s$ |
|---|---|---|---|
| 11 | 1.533 | $R_1 = -18.283''$ $R_2 = -18.750''$ | $t = .375''$ |
| 12 | ---- | $R_3 = -80.000''$ | $s = 15.000''$ |
| 13 | ---- | $\infty$ | $s = 15.000''$ |

Equivalent Focal length: +40.000". Rel. Aperture: F/8 and a second telephoto system constructed as follows:

| Element | $N_D$ | Radii | Thickness: $t$ Separation: $s$ |
|---|---|---|---|
| 11A | 1.533 | $R_1 = -26.544''$ | $t = .544''$ |
|  |  | $R_2 = -27.222''$ | $s = 27.487''$ |
| 12A | ---- | $R_3 = -97.000''$ | $s = 27.487''$ |
| 17 | ---- | $R_4 = -110.429''$ |  |

Equivalent Focal Length: +80.000". Rel. Aperture: F/15

As the correction plates in both these systems are nearly powerless, almost no chromatic aberration is introduced by them. As the mirrors, by their very nature, will not produce chromatic aberrations of their own but will actually reduce the insignificant color of the correction plate even further, the two set forth systems are practically free from chromatic aberrations, both longitudinally and laterally.

The shape and position of the several elements have been selected in such manner that all monochromatic aberrations are substantially eliminated, and both systems can be regarded as being fully corrected for the entire electro-magnetic spectrum used in image formation.

Having set forth my invention what I desire to claim and secure by Letters Patent is:

1. An optical system, comprising in combination, a concave spherical mirror, said mirror provided with a center aperture, a correction plate spaced at a predetermined distance ahead of said spherical mirror opposite to the concave side thereof, said correction plate provided with a plane mirror on the rear convex side thereof, facing the concave face of said spherical mirror, constructed in accordance with the following specifications:

Equivalent focal length of system _____ inches __ 40
Speed _____ F:8
Radius of curvature of correction plate $R_1$_inches__ 18.283
Radius of curvature of correction plate $R_2$__do____ 18.750
Central thickness $t$ of correction plate____do____ .375
Index of refraction of correction plate $N_D$_____ 1.533
First surface spherical concave mirror $R_3$_inches__ 80
Distance $s$ between rear surface of correction plate and mirror _____ inches__ 15.500

Wherein R means radius; $t$ means thickness; S means spacing; F means relative aperture; $N_D$ means index of refraction for sodium light and R and $s$ etc. identify varying radii and spacings.

2. An optical system comprising in combination a concave spherical mirror, said mirror provided with a centered aperture, a correction plate spaced at a predetermined distance ahead of said spherical concave mirror, said correction plate provided with a convex-spherical mirror on the rearward side thereof facing the concave side of said concave spherical mirror, constructed in accordance with the following specifications:

Equivalent focal length of system _____ inches __ 80
Speed of system _____ F:15
Correction plate $R_1$ _____ inches__ 26.544
Correction plate $R_2$ _____ do____ 27.222
Center thickness $t$ of correction plate_____ do____ 0.544
Index of refraction of correction plate $N_D$_____ 1.533
First surface spherical concave mirror $R_3$_inches__ 97
Convex mirror radius $R_4$ _____ do____ 110.429
Distance $s$ between correction plate and concave mirror _____ inches__ 27.487

Wherein R means radius; $t$ means thickness; S means spacing; F means relative aperture; $N_D$ means index of refraction for sodium light and R and S etc. identify varying radii and spacings.

FRANK G. BACK.

REFERENCES CITED

The following references are of record in the file of this patent:

UNITED STATES PATENTS

| Number | Name | Date |
|---|---|---|
| 2,378,301 | Kaprelian | June 12, 1945 |
| 2,403,660 | Hayward | July 9, 1946 |

FOREIGN PATENTS

| Number | Country | Date |
|---|---|---|
| 538,622 | Great Britain | Aug. 11, 1941 |
| 898,315 | France | July 3, 1944 |

OTHER REFERENCES

Journal of the Optical Society; Article by Maksutov on New Catadioptric Meniscus Systems, vol. 34, No. 5, May, 1944, pages 278 to 280. Publ. by American Institute of Physics, Inc., 57 East 55th Street, New York city.